UNITED STATES PATENT OFFICE.

HUGH V. BURT, OF ROCK ISLAND, ILLINOIS.

ALUMINUM-SOLDERING FLUX.

1,225,764.     Specification of Letters Patent.     Patented May 15, 1917.

No Drawing.     Application filed March 2, 1916. Serial No. 81,664.

*To all whom it may concern:*

Be it known that I, HUGH V. BURT, a citizen of the United States, residing at Rock Island, in the county of Rock Island and State of Illinois, have invented certain new and useful Improvements in Aluminum-Soldering Flux, of which the following is a specification.

My invention has reference to aluminum soldering flux, and has for its purpose the preparation of a sheet of aluminum metal for the union therewith of aluminum solder such as is employed in repairing aluminum vessels and articles. It is a recognized fact that the welding or uniting of any metal or alloy of metals with aluminum is difficult of accomplishment, on account of the apparent reluctance of the aluminum to unite or cohere with other metals. By the use of my invention this reluctance is overcome, and by the application thereof to the aluminum immediately preceding the use of the solder, a perfect and lasting union is effected.

The ingredients which are used in preparing the flux, and the proportions thereof, are substantially as follows:—oleic acid, 90 parts, spirit of ammonia, 8 parts; oil of citronella, 2 parts.

The compound is prepared by mixing the above ingredients at a normal atmospheric temperature, resulting in the production of a liquid which can be readily applied to the metal. In use the sheet or plate of aluminum which is to receive the solder is thoroughly cleansed by washing or otherwise removing any impurities that may be thereon, and a portion of the flux applied thereto under a moderate degree of heat, such heat being provided by applying warmth to the metal itself. The solder is then applied in the usual manner and adheres perfectly to the metal.

In the operation above mentioned, when the oleic acid responds to the heat, it is diffused into acrid gases which appear to have the desired effect upon the aluminum metal, the spirit of ammonia producing a saponifying effect, thus preventing a burning or charring of the ingredients such as would result if only the acid and the oil of citronella were used, any such charring being detrimental to the perfect operation and interfering with the fusion of the metals. The chief function of the oil of citronella is to overcome the disagreeable odor possessed by the oleic acid, especially when heat is applied thereto.

Changes can be made in the proportions of said ingredients and the manner of producing the flux, without departing materially from the action and effectiveness thereof.

What I claim as my invention, and desire to secure by Letters Patent of the United States, is:

A flux for soldering alumina, consisting of oleic acid, ninety parts and spirit of ammonia eight parts.

In testimony whereof I affix my signature in presence of two witnesses.

HUGH V. BURT.

Witnesses:
    W. N. HASKELL,
    GEO. D. BLEM.

Copies of this patent may be obtained for five cents each, by addressing the "Commissioner of Patents, Washington, D. C."